US009051860B2

(12) United States Patent
Inoue et al.

(10) Patent No.: US 9,051,860 B2
(45) Date of Patent: *Jun. 9, 2015

(54) EXHAUST PURIFICATION SYSTEM OF INTERNAL COMBUSTION ENGINE

(75) Inventors: Mikio Inoue, Susono (JP); Kohei Yoshida, Gotenba (JP); Yuki Bisaiji, Mishima (JP); Kazuhiro Umemoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 162 days.

This patent is subject to a terminal disclaimer.

(21) Appl. No.: 13/264,649

(22) PCT Filed: May 20, 2010

(86) PCT No.: PCT/JP2010/058942
§ 371 (c)(1),
(2), (4) Date: Oct. 14, 2011

(87) PCT Pub. No.: WO2011/145227
PCT Pub. Date: Nov. 24, 2011

(65) Prior Publication Data
US 2013/0058840 A1 Mar. 7, 2013

(51) Int. Cl.
*F01N 3/10* (2006.01)
*F01N 3/00* (2006.01)
(Continued)

(52) U.S. Cl.
CPC .......... *F01N 3/0814* (2013.01); *B01D 53/9418* (2013.01); *B01D 53/9422* (2013.01);
(Continued)

(58) Field of Classification Search
None
See application file for complete search history.

(56) References Cited

U.S. PATENT DOCUMENTS 5,388,406 A 2/1995 Takeshima et al.
6,182,443 B1 2/2001 Jarvis et al.
(Continued)

FOREIGN PATENT DOCUMENTS

EP 1 544 429 6/2005
JP A-H05-195755 8/1995
(Continued)

OTHER PUBLICATIONS

Aug. 24, 2010 Search Report issued in International Patent Application No. PCT/JP2010/058942.
(Continued)

*Primary Examiner* — Walter D Griffin
*Assistant Examiner* — Jelitza Perez
(74) *Attorney, Agent, or Firm* — Oliff PLC

(57) ABSTRACT

In an internal combustion engine, inside of an engine exhaust passage, a hydrocarbon feed valve (16), an exhaust purification catalyst (13), an aqueous urea solution feed valve (17), and an $NO_x$ selective reduction catalyst (15) are arranged in that order. A first $NO_x$ purification method which makes the concentration of hydrocarbons flowing into the exhaust purification catalyst (13) vibrate by within predetermined ranges of amplitude and period to reduce the $NO_x$ contained in exhaust gas in the exhaust purification catalyst (13) is normally used. A second $NO_x$ purification method which uses the fed aqueous urea solution to reduce the $NO_x$ in the $NO_x$ selective reduction catalyst (15) is used when the fed hydrocarbons exceed the allowable value.

12 Claims, 17 Drawing Sheets

(51) Int. Cl.
*F01N 3/08* (2006.01)
*F01N 3/20* (2006.01)
*F01N 9/00* (2006.01)
*F01N 13/00* (2010.01)
*B01J 37/02* (2006.01)
*B01J 23/40* (2006.01)
*B01J 23/58* (2006.01)
*B01J 23/63* (2006.01)
*B01D 53/94* (2006.01)

(52) U.S. Cl.
CPC .... *B01D53/9477* (2013.01); *B01D 2251/2067* (2013.01); *B01D 2251/208* (2013.01); *B01D 2257/404* (2013.01); *F01N 3/0842* (2013.01); *F01N 3/0871* (2013.01); *F01N 3/2066* (2013.01); *F01N 9/00* (2013.01); *F01N 2240/30* (2013.01); *F01N 2900/0412* (2013.01); *F01N 2900/0422* (2013.01); *Y02T 10/47* (2013.01); *Y02T 10/24* (2013.01); *F01N 13/009* (2014.06); *B01J 37/0244* (2013.01); *B01J 23/40* (2013.01); *B01J 23/58* (2013.01); *B01J 23/63* (2013.01); *F01N 3/208* (2013.01); *F01N 2610/03* (2013.01)

(56) References Cited

U.S. PATENT DOCUMENTS

| | | | |
|---|---|---|---|
| 6,354,079 | B1 | 3/2002 | Choi et al. |
| 7,213,395 | B2 | 5/2007 | Hu et al. |
| 7,332,135 | B2 * | 2/2008 | Gandhi et al. ............... 422/177 |
| 7,650,746 | B2 | 1/2010 | Hu et al. |
| 2002/0152745 | A1 | 10/2002 | Patchett et al. |
| 2005/0034450 | A1 | 2/2005 | Itoh et al. |
| 2006/0130458 | A1 | 6/2006 | Solbrig |
| 2006/0153761 | A1 | 7/2006 | Bandl-Konrad et al. |
| 2006/0288689 | A1 | 12/2006 | Shimoda |
| 2007/0056266 | A1 | 3/2007 | Kurtz |
| 2007/0089403 | A1 | 4/2007 | Pfeifer et al. |
| 2007/0175208 | A1 | 8/2007 | Bandl-Konrad et al. |
| 2007/0271908 | A1 | 11/2007 | Hemingway et al. |
| 2009/0173064 | A1 * | 7/2009 | Ren et al. ........................ 60/299 |
| 2010/0089039 | A1 * | 4/2010 | Asanuma et al. ............... 60/286 |
| 2010/0236224 | A1 | 9/2010 | Kumar et al. |
| 2010/0242448 | A1 | 9/2010 | Mital |
| 2011/0005204 | A1 | 1/2011 | Bandl-Konrad et al. |
| 2013/0011313 | A1 | 1/2013 | Bandl-Konrad et al. |

FOREIGN PATENT DOCUMENTS

| | | |
|---|---|---|
| JP | A-H11-081992 | 3/1999 |
| JP | A-2000-230414 | 8/2000 |
| JP | A-2000-265828 | 9/2000 |
| JP | A-2001-193443 | 7/2001 |
| JP | A-2002-188429 | 7/2002 |
| JP | A-2003-065036 | 3/2003 |
| JP | A-2003-269142 | 9/2003 |
| JP | A-2003-286827 | 10/2003 |
| JP | A-2005-002925 | 1/2005 |
| JP | A-2006-009606 | 1/2006 |
| JP | A-2006-512529 | 4/2006 |
| JP | A-2006-274986 | 10/2006 |
| JP | B2-3969450 | 9/2007 |
| WO | WO 2006/008625 A1 | 1/2006 |

OTHER PUBLICATIONS

Aug. 24, 2010 Search Report in International Patent Application No. PCT/JP2010/058953 (with translation).

U.S. Appl. No. 13/262,865, filed Oct. 4, 2011, in the name of Inoue et al.

Aug. 7, 2013 Notice of Allowance issued in U.S. Appl. No. 13/262,865.

* cited by examiner

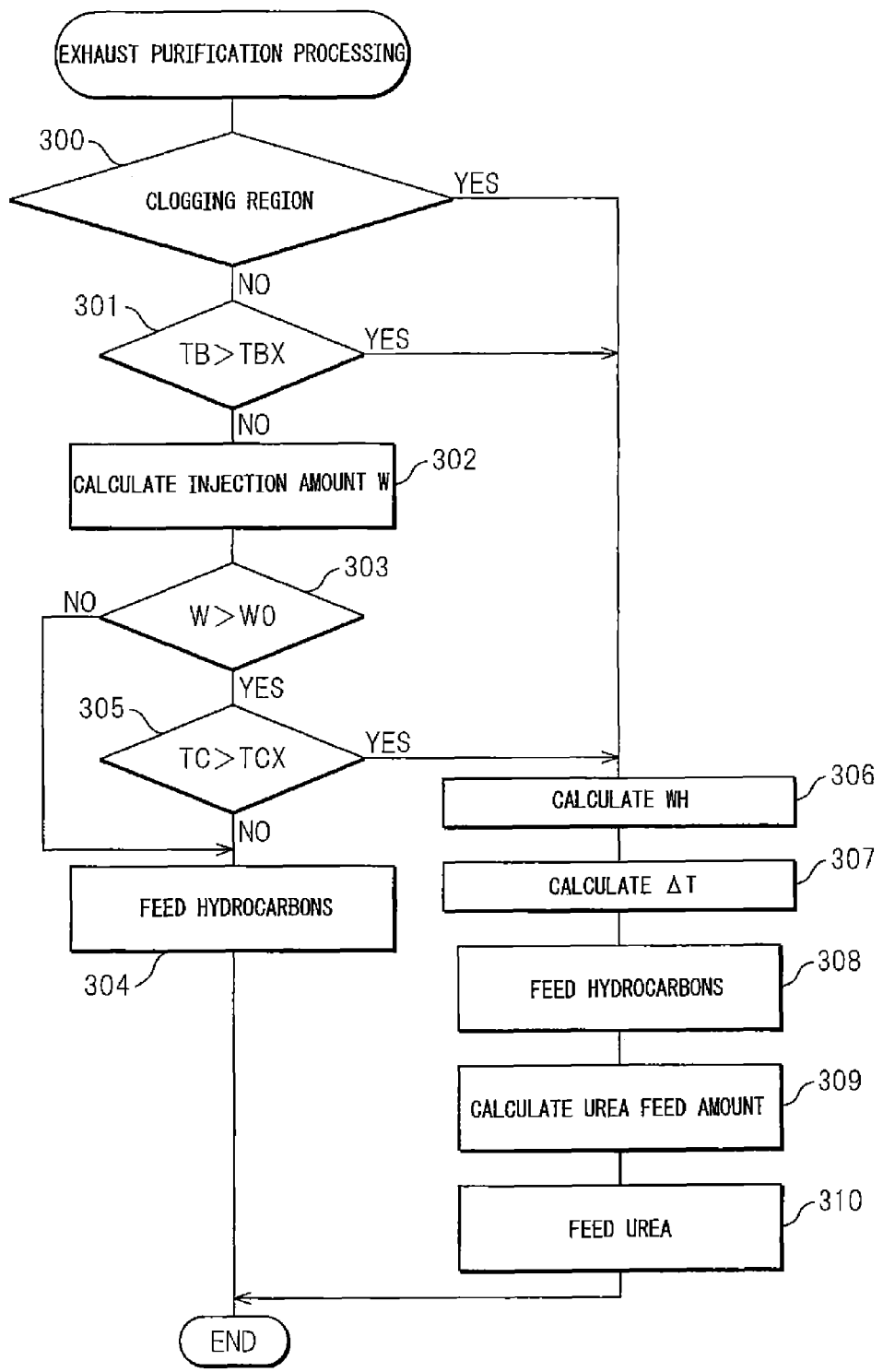

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst becomes a high temperature, the $NO_x$ purification rate falls.

An object of the present invention is to provide an exhaust purification system of an internal combustion engine which can give a high $NO_x$ purification rate even if the temperature of the exhaust purification catalyst is a high temperature and which can reduce the amount of consumption of hydrocarbons.

Solution to Problem

According to the present invention, there is provided an exhaust purification system of an internal combustion engine wherein an exhaust purification catalyst for reacting $NO_x$ contained in exhaust gas and reformed hydrocarbons is arranged inside of an engine exhaust passage, urea feeding means and an $NO_x$ selective reduction catalyst able to reduce $NO_x$ using ammonia derived from a fed urea are arranged inside of the engine exhaust passage downstream of the exhaust purification catalyst, a precious metal catalyst is carried on an exhaust gas flow surface of the exhaust purification catalyst and a basic exhaust gas flow surface part is formed around the precious metal catalyst, the exhaust purification catalyst has a property of reducing the $NO_x$ which is contained in exhaust gas if making a concentration of hydrocarbons flowing into the exhaust purification catalyst vibrate by within a predetermined range of amplitude and within a predetermined range of period and has a property of being increased in storage amount of $NO_x$ which is contained in exhaust gas when the vibration period of the hydrocarbon concentration is made longer than the predetermined range, and, at the time of engine operation, usually a first $NO_x$ purification method which makes the concentration of hydrocarbons flowing into the exhaust purification catalyst vibrate by within the predetermined range of amplitude and within the predetermined range of period so as to reduce $NO_x$ contained in exhaust gas in the exhaust purification catalyst is used, and a second $NO_x$ purification method which uses an ammonia derived from the fed urea to reduce $NO_x$ contained in exhaust gas at the $NO_x$ selective reduction catalyst when a representative value representing an amount of hydrocarbons which is consumed for removal of $NO_x$ using the first $NO_x$ purification method exceeds a predetermined allowable value regardless of whether the $NO_x$ selective reduction catalyst is activated or if the $NO_x$ selective reduction catalyst is activated.

Advantageous Effects of Invention

Even if the temperature of the exhaust purification catalyst becomes a high temperature, a high $NO_x$ purification rate can be obtained. Further, when a representative value exceeds the allowable value, that is, when the amount of consumption of hydrocarbons is increased, if the second $NO_x$ purification method is used, the amount of consumption of hydrocarbons can be reduced.

BRIEF DESCRIPTION OF DRAWINGS

FIG. 25 is a flow chart for exhaust purification control.

DESCRIPTION OF EMBODIMENTS

Figure 1:
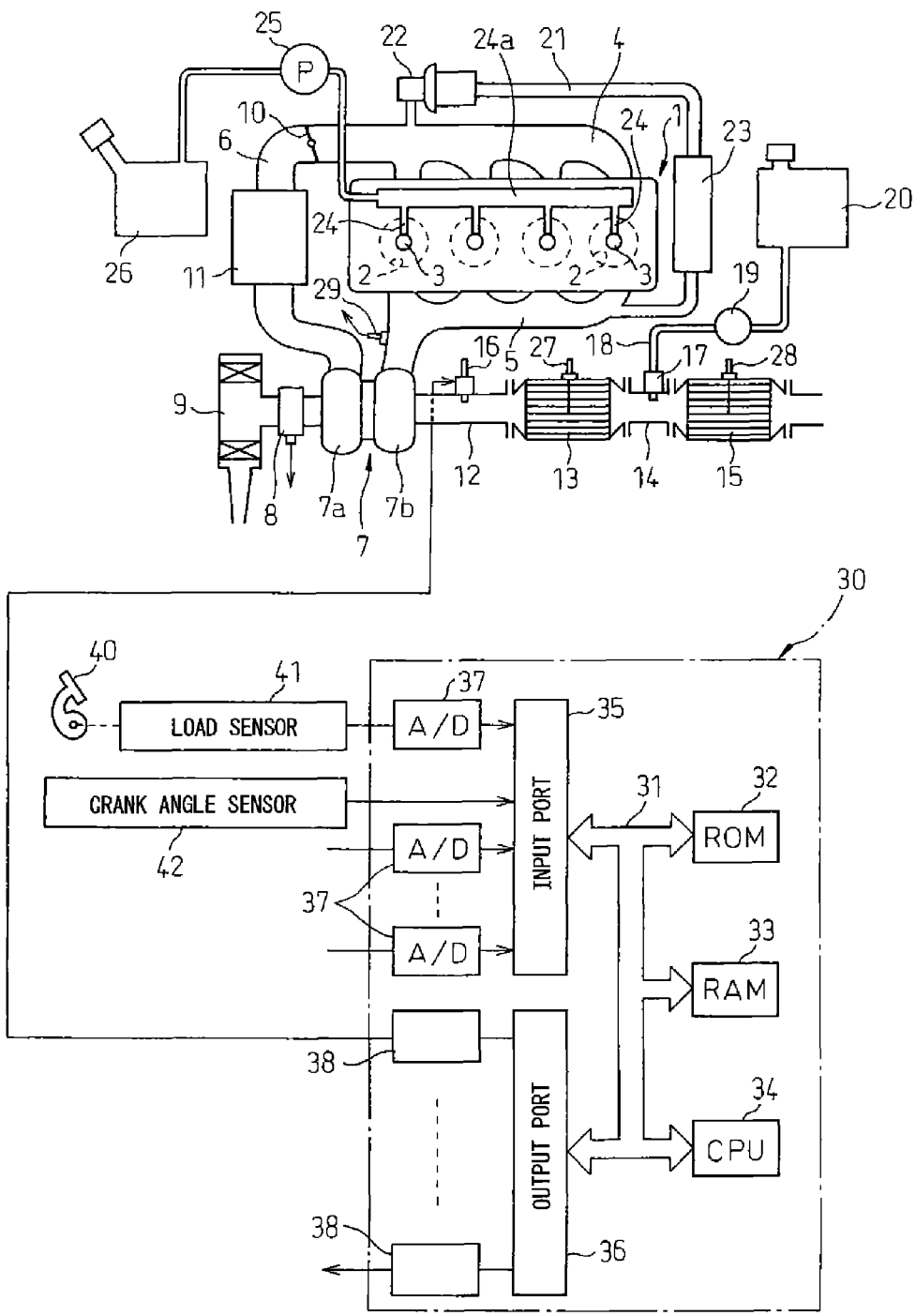
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of the exhaust turbine 7b of the exhaust turbocharger 7. The outlet of the exhaust turbine 7b is connected through an exhaust pipe 12 to an inlet of an exhaust purification catalyst 13, while an outlet of the exhaust purification catalyst 13 is connected to an $NO_x$ selective reduction catalyst 15 which can reduce the $NO_x$ which is contained in exhaust gas in the presence of ammonia through an exhaust pipe 14. Inside of the exhaust pipe 12 upstream of the exhaust purification catalyst 13, a hydrocarbon feed valve 16 is arranged for feeding hydrocarbons comprised of diesel oil or other fuel used as fuel of a compression ignition type internal combustion engine. In the embodiment shown in FIG. 1, diesel oil is used as the hydrocarbons which are fed from the hydrocarbon feed valve 16. Note that, the present invention can also be applied to a spark ignition type internal combustion engine which burns fuel under a lean air-fuel ratio. In this case, hydrocarbons comprised of gasoline or other fuel which is used as fuel of a spark ignition type internal combustion engine are fed from the hydrocarbon feed valve 16.

In the exhaust pipe 14 upstream of the $NO_x$ selective reduction catalyst 15, an aqueous urea solution feed device, for example, an aqueous urea solution feed valve 17, is arranged. This aqueous urea solution feed valve 17 is connected through a feed pipe 18 and a feed pump 19 to an aqueous urea solution tank 20. The aqueous urea solution which is stored in the aqueous urea solution tank 20 is injected by the feed pump 19 into the exhaust gas which flows from the aqueous urea solution feed valve 17 to the inside of the exhaust pipe 14. Due to the ammonia generated from the urea (($NH_2)_2CO$+$H_2O \rightarrow 2NH_3+CO_2$), the $NO_x$ which is contained in exhaust gas is reduced in the $NO_x$ selective reduction catalyst 15. In this embodiment shown in FIG. 1, this $NO_x$ selective reduction catalyst 15 is comprised of Fe zeolite.

On the other hand, the exhaust manifold 5 and the intake manifold 4 are connected with each other through an exhaust gas recirculation (hereinafter referred to as an "EGR") passage 21. Inside the EGR passage 21, an electronically controlled EGR control valve 22 is arranged. Further, around the EGR passage 21, a cooling device 23 is arranged for cooling EGR gas flowing through the inside of the EGR passage 21. In the embodiment shown in FIG. 1, the engine cooling water is guided to the inside of the cooling device 23 where the engine cooling water is used to cool the EGR gas. On the other hand, each fuel injector 3 is connected through a fuel feed tube 24 to a common rail 24a. This common rail 24a is connected through an electronically controlled variable discharge fuel pump 25 to a fuel tank 26. The fuel which is stored inside of the fuel tank 26 is fed by the fuel pump 25 to the inside of the common rail 24a. The fuel which is fed to the inside of the common rail 24a is fed through each fuel feed tube 24 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. At the exhaust purification catalyst 13, a temperature sensor 27 is attached for detecting the temperature of the exhaust purification catalyst 13, while at the $NO_x$ selective reduction catalyst 15, a temperature sensor 28 is attached for detecting the temperature of the $NO_x$ selective reduction catalyst 15. Further, at the collecting portion of the exhaust manifold 5, an air-fuel ratio sensor 29 is arranged. The output signals of these temperature sensors 27 and 28, the air-fuel ratio sensor 29, and the intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, a step motor for driving the throttle valve 10, hydrocarbon feed valve 16, aqueous urea solution feed valve 17, feed pump 18, EGR control valve 22 and fuel pump 25.

Figure 2:
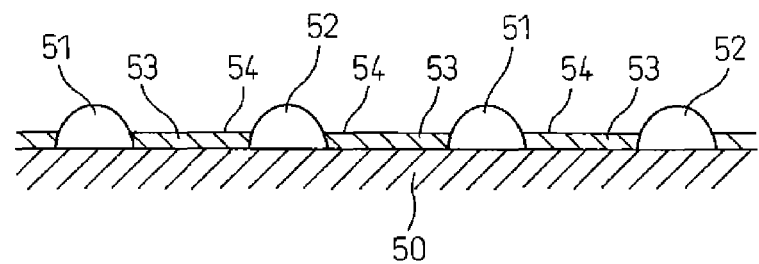
FIG. 2 is a view schematically showing a surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on, the catalyst carrier 50 are comprised of platinum Pt and at least one of rhodium Rh and palladium Pd.

Figure 3:
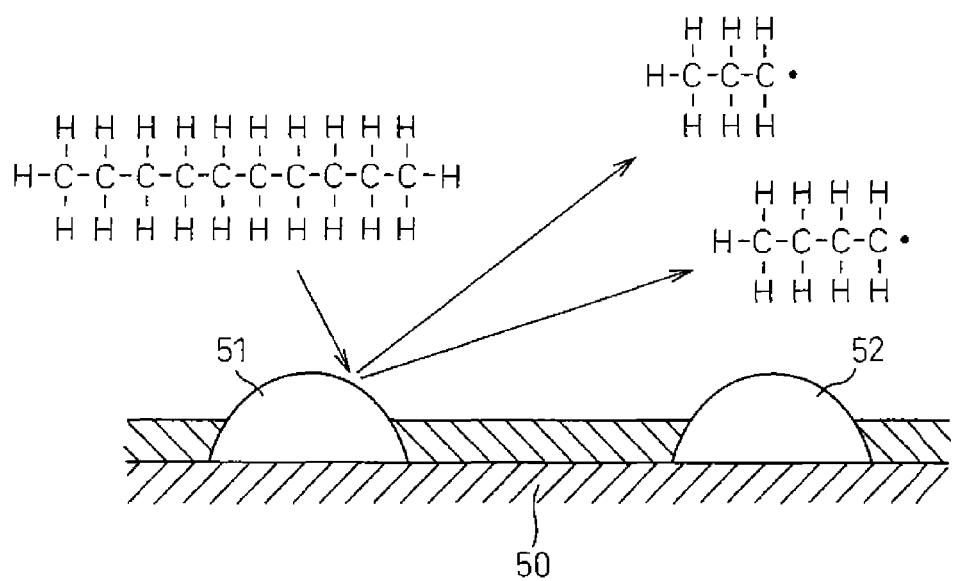
FIG. 3 is a view for explaining an oxidation reaction in an exhaust purification catalyst.

If hydrocarbons are injected from the hydrocarbon feed valve 16 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification catalyst 13 at this time. As shown in FIG. 3, the hydrocarbons HC which are injected from the hydrocarbon feed valve 16 become radical hydrocarbons HC with a small carbon number by the catalyst 51.

Note that, even if injecting fuel, that is, hydrocarbons, from the fuel injector 3 into the combustion chamber 2 during the latter half of the expansion stroke or during the exhaust stroke, the hydrocarbons are reformed inside of the combustion chamber 2 or at the exhaust purification catalyst 13, and the $NO_x$ which is contained in the exhaust gas is removed by the reformed hydrocarbons at the exhaust purification catalyst 13. Therefore, in the present invention, instead of feeding hydrocarbons from the hydrocarbon feed valve 16 to the inside of the engine exhaust passage, it is also possible to feed hydrocarbons into the combustion chamber 2 during the latter half of the expansion stroke or during the exhaust stroke. In this way, in the present invention, it is also possible to feed hydrocarbons to the inside of the combustion chamber 2, but below the present invention is explained taking as an example the case of injecting hydrocarbons from the hydrocarbon feed valve 16 to the inside of the engine exhaust passage.

Figure 4:
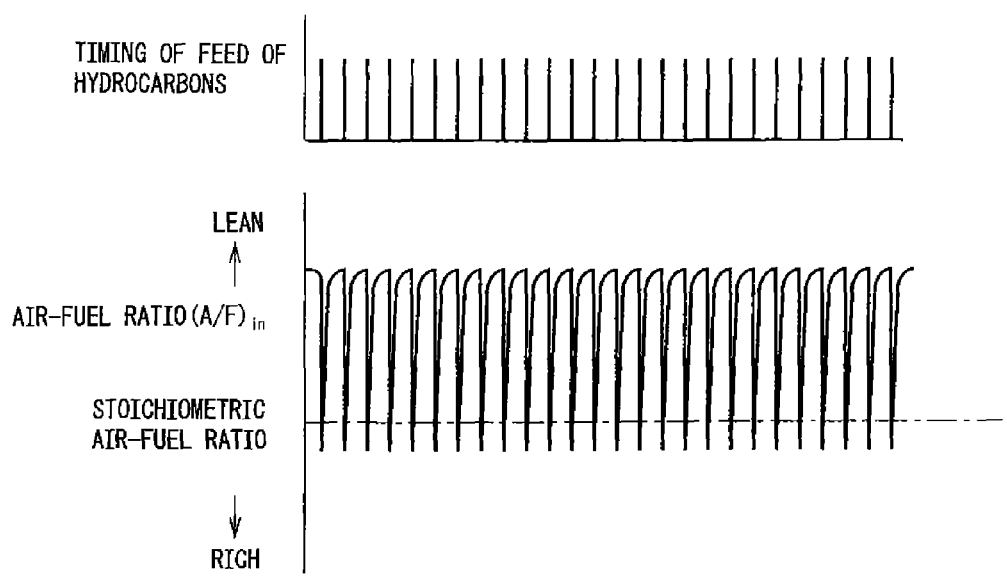
FIG. 4 is a view showing a change of an air-fuel ratio of exhaust gas flowing into an exhaust purification catalyst.

FIG. 4 shows the timing of feeding hydrocarbons from the hydrocarbon feed valve 16 and the changes in the air-fuel ratio (A/F)in of the exhaust gas flowing into the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
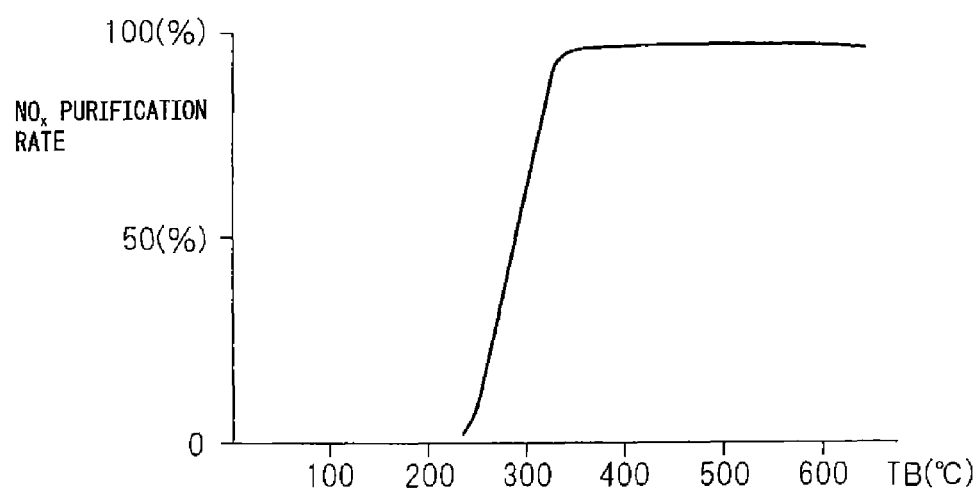
FIG. 5 is a view showing an $NO_x$ purification rate.

FIG. 5 shows the $NO_x$ purification rate by the exhaust purification catalyst 13 with respect to the catalyst temperature TB of the exhaust purification catalyst 13 when periodically making the concentration of hydrocarbons flowing into the exhaust purification catalyst 13 change so as to, as shown in FIG. 4, make the air-fuel ratio (A/F)in of the exhaust gas flowing to the exhaust purification catalyst 13 change. The inventors engaged in research relating to $NO_x$ purification for a long time. In the process of research, they learned that if making the concentration of hydrocarbons flowing into the exhaust purification catalyst 13 vibrate by within a predetermined range of amplitude and within a predetermined range of period, as shown in FIG. 5, an extremely high $NO_x$ purification rate is obtained even in a 400° C. or higher high temperature region.

Figure 6A:
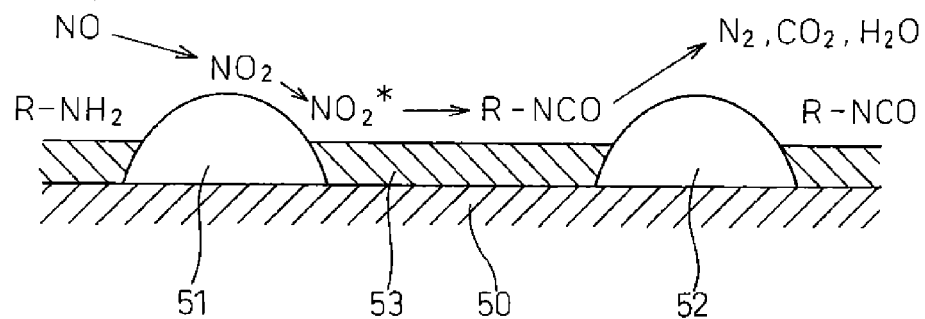
FIGS. 6A and 6B are views for explaining an oxidation reduction reaction in an exhaust purification catalyst.
Figure 6B:
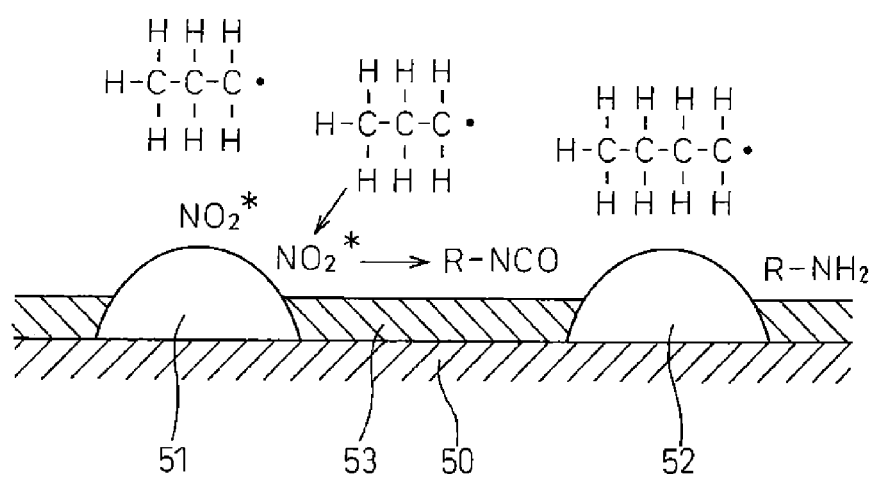

Furthermore, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_x$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons flowing into the exhaust purification catalyst 13 is made to vibrate by within a predetermined range of amplitude and within a predetermined range of period.

FIG. 6A shows when the concentration of hydrocarbons flowing into the exhaust purification catalyst 13 is low, while FIG. 6B shows when hydrocarbons are fed from the hydrocarbon feed valve 16 and the concentration of hydrocarbons flowing into the exhaust purification catalyst 13 becomes high.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the NO which is contained in the exhaust gas, as shown in FIG. 6A, is oxidized on the platinum 51 and becomes $NO_2$. Next, this $NO_2$ is supplied with electrons from the platinum 51 and becomes $NO_2^-$. Therefore, a large amount of $NO_2^-$ is produced on the platinum 51. This $NO_2^-$ is strong in activity. Above, this $NO_2^-$ is called the active $NO_2^*$.

On the other hand, if hydrocarbons are fed from the hydrocarbon feed valve 15, as shown in FIG. 3, the hydrocarbons are reformed and become radicalized inside of the exhaust purification catalyst 13. As a result, as shown in FIG. 6B, the hydrocarbon concentration around the active $NO_2^*$ becomes higher. In this regard, after the active $NO_2^*$ is produced, if the state of a high oxygen concentration around the active $NO_2^*$ continues for a predetermined time or more, the active $NO_2^*$ is oxidized and is absorbed in the basic layer 53 in the form of nitrate ions $NO_3^-$. However, if the hydrocarbon concentration around the active $NO_2$ is made higher before this predetermined time passes, as shown in FIG. 6B, the active $NO_2^*$ reacts on the platinum 51 with the radical hydrocarbons HC whereby a reducing intermediate is produced. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO, when hydrolyzed, becomes an amine compound R—$NH_2$. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound R—$NH_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons flowing into the exhaust purification catalyst 13 is lowered and thereby the oxygen concentration becomes higher, the hydrocarbons around the reducing intermediate will be oxidized. As a result, as shown in FIG. 6A, the reducing intermediate and the active $NO_2^*$ will react. At this time, the active $NO_2^*$ reacts with the reducing intermediate R—NCO or R—$NH_2$ to form $N_2$, $CO_2$, and $H_2O$ and consequently the $NO_x$ is removed.

In this way, in the exhaust purification catalyst 13, by making the concentration of hydrocarbons flowing into the exhaust purification catalyst 13 higher, a reducing intermediate is produced. By making the concentration of hydrocarbons flowing into the exhaust purification catalyst 13 lower and raising the oxygen concentration, the active $NO_2^*$ reacts with the reducing intermediate and the $NO_x$ is removed. That is, in order for the exhaust purification catalyst 13 to remove the $NO_x$, the concentration of hydrocarbons flowing into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_2^*$. That is, the concentration of hydrocarbons flowing into the exhaust purification catalyst 13 has to be made to vibrate within a predetermined range of amplitude. Note that, in this case, a sufficient amount of reducing intermediate R—NCO or R—$NH_2$ has to be held on the basic layer 53, that is, on the basic exhaust gas flow surface part 54, until the produced reducing intermediate reacts with the active $NO_2^*$. For this reason, the basic exhaust gas flow surface part 54 is provided.

On the other hand, if lengthening the feed period of the hydrocarbons, the time in which the oxygen concentration becomes higher becomes longer in the period after the hydrocarbons are fed until the hydrocarbons are next fed. Therefore, the active $NO_2^*$ is absorbed in the basic layer 53 in the form of nitrates without producing a reducing intermediate. To avoid this, it is necessary to make the concentration of hydrocarbons flowing into the exhaust purification catalyst 13 vibrate by within a predetermined range of period.

Therefore, in an embodiment of the present invention, to make the $NO_x$ contained in the exhaust gas and the reformed hydrocarbons react and produce the reducing intermediate R—NCO or R—$NH_2$ containing nitrogen and hydrocarbons, precious metal catalysts 51 and 52 are carried on the exhaust gas flow surface of the exhaust purification catalyst 13. To hold the produced reducing intermediate R—NCO or R—$NH_2$ inside the exhaust purification catalyst 13, a basic exhaust gas flow surface part 54 is formed around the precious metal catalysts 51 and 52. $NO_x$ is reduced by the reducing action of the reducing intermediate R—NCO or R—$NH_2$ held on the basic exhaust gas flow surface part 54, and the vibration period of the hydrocarbon concentration is made the vibration period required for continuation of the production of the reducing intermediate R—NCO or R—$NH_2$. Incidentally, in the example shown in FIG. 4, the injection interval is made 3 seconds.

Figure 7A:
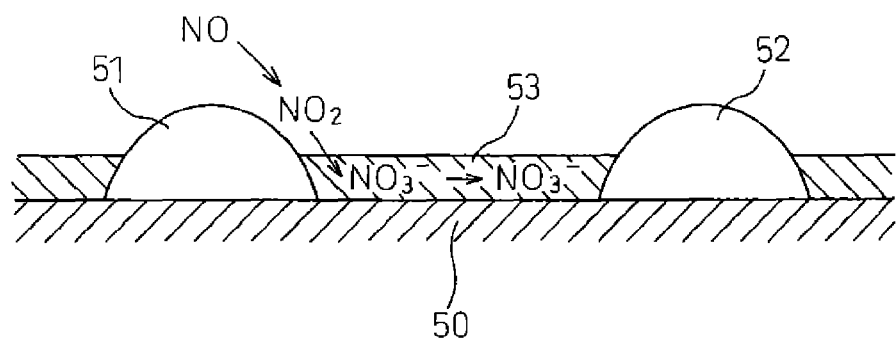
FIGS. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediate R—NCO or R—$NH_2$ disappears from the surface of the basic layer 53. At this time, the active $NO_2^*$ which is produced on the platinum Pt 51, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
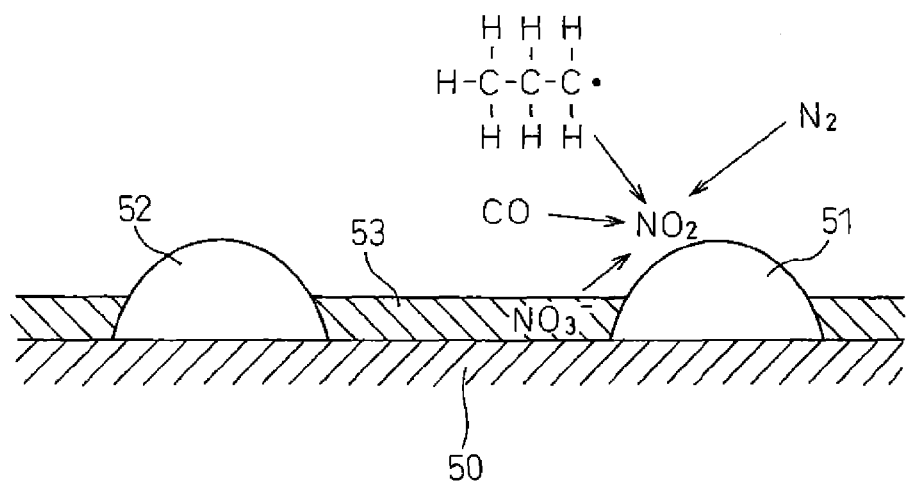

On the other hand, FIG. 7B shows the case where the air-fuel ratio of the exhaust gas which flows into the exhaust purification catalyst 13 is made the stoichiometric air-fuel ratio or rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 become nitrate ions $NO_3$ one by one and, as shown in FIG. 7B, are released from the basic layer 53 in the form of $NO_2$. Next, the released $NO_2$ is reduced by the hydrocarbons HC and CO contained in the exhaust gas.

Figure 8:
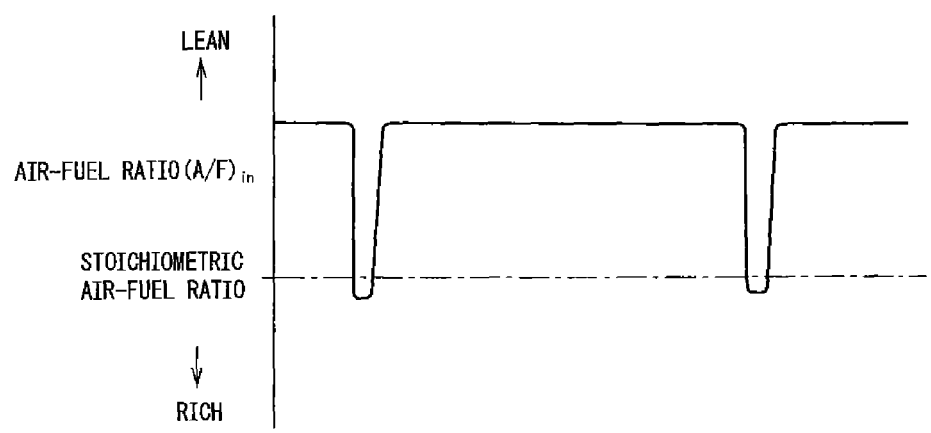
FIG. 8 is a view showing a change of an air-fuel ratio of exhaust gas flowing into an exhaust purification catalyst.

FIG. 8 shows the case of making the air-fuel ratio (A/F)in of the exhaust gas which flows into the exhaust purification catalyst 13 temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using term of storage as a term including both absorption and adsorption, at this time, the basic layer 53 performs the role of an $NO_x$ storage agent for temporarily storing the $NO_x$. That is, in this case, if the ratio of the air and fuel (hydrocarbons) which are supplied into the engine intake passage, combustion chambers 2 and exhaust passage upstream of the exhaust purification catalyst 13 is referred to as the air-fuel ratio of the exhaust gas, the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
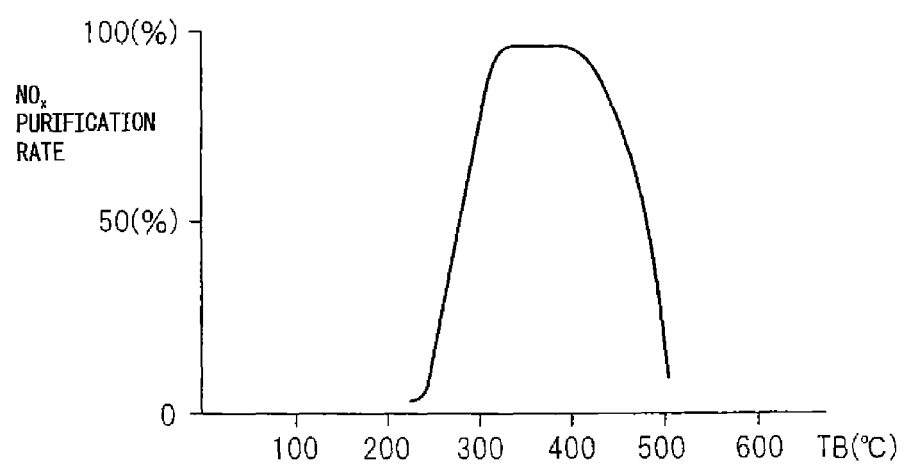
FIG. 9 is a view of an $NO_x$ purification rate.

FIG. 9 shows the $NO_x$ purification rate when making the exhaust purification catalyst 13 function as an $NO_x$ storage catalyst in this way. Note that, the abscissa of the FIG. 9 shows the catalyst temperature TC of the exhaust purification catalyst 13. When making the exhaust purification catalyst 13 function as an $NO_x$ storage catalyst, as shown in FIG. 9, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate. However, in the new $NO_x$ purification method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ purification rate is obtained.

Therefore, in the present invention, an exhaust purification catalyst 13 is arranged in the engine exhaust passage for reacting the $NO_x$ which is contained in the exhaust gas and the reformed hydrocarbon. Precious metal catalysts 51 and 52 are carried on the exhaust gas flow surface of the exhaust purification catalyst 13. Around the precious metal catalysts 51 and 52, a basic exhaust gas flow surface part 54 is formed. The exhaust purification catalyst 13 has the property of reducing the $NO_x$ which is contained in the exhaust gas if making the concentration of hydrocarbons flowing into the exhaust purification catalyst 13 vibrate by within a predetermined range of amplitude and within a predetermined range of period and has the property of being increased in storage amount of the $NO_x$ which is contained in the exhaust gas if making the vibration period of the hydrocarbon concentration longer than this predetermined range. At the time of engine operation, usually, the concentration of hydrocarbons flowing into the exhaust purification catalyst 13 is made to vibrate within the predetermined range of amplitude and within the predetermined range of period. Due to this, the $NO_x$ which is contained in the exhaust gas is reduced in the exhaust purification catalyst 13.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries a precious metal catalyst and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst. This new $NO_x$ purification method will be called the first $NO_x$ purification method below.

Next, referring to FIG. 10 to FIG. 15, this first $NO_x$ purification method will be explained in more detail.

Figure 10:
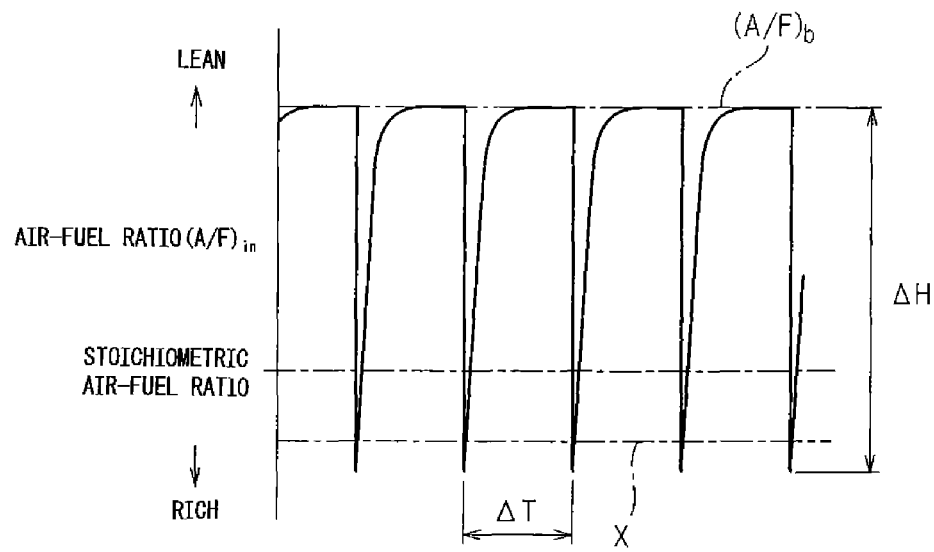
FIG. 10 is a time chart showing a change of an air-fuel ratio of exhaust gas flowing into an exhaust purification catalyst.

FIG. 10 shows enlarged the change in the air-fuel ratio (A/F)in shown in FIG. 4. Note that, as explained above, the change in the air-fuel ratio (A/F)in of the exhaust gas flowing into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F)in which is used for producing the reducing intermediate without the produced active $NO_2$* being stored in the form of nitrates inside the basic layer 53. To make the active $NO_2$* and the reformed hydrocarbons react and produce the reducing intermediate, it is necessary to make the air-fuel ratio (A/F)in lower than the upper limit X of this air-fuel ratio.

In other words, in FIG. 10, X shows the lower limit of the concentration of hydrocarbons required for making the active $NO_2$* and reformed hydrocarbon react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_2$*, that is, the air-fuel ratio (A/F)in. The upper limit X of the air-fuel ratio required for producing the reducing intermediate will below be called the demanded minimum air-fuel ratio.

In the example shown in FIG. 10, the demanded minimum air-fuel ratio X is rich, therefore, in this case, to form the reducing intermediate, the air-fuel ratio (A/F)in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F)in is maintained lean while periodically reducing the air-fuel ratio (A/F)in so as to form the reducing intermediate.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 11:
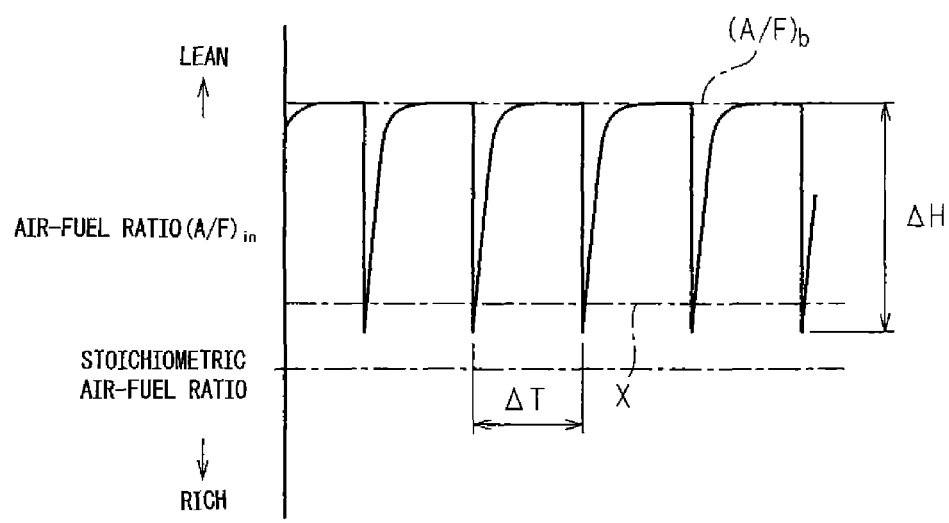
FIG. 11 is a time chart showing a change of an air-fuel ratio of exhaust gas flowing into an exhaust purification catalyst.

Now, if using an exhaust purification catalyst 13 with a strong oxidizing strength, as shown in FIG. 11, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, the reducing intermediate can no longer be produced. As opposed to this, when using an exhaust purification catalyst 13 with a strong oxidizing strength, as shown in FIG. 10, if making the air-fuel ratio (A/F)in periodically rich, when the air-fuel ratio (A/F)in is made rich, the hydrocarbons will be partially oxidized, without being completely oxidized, that is, the hydrocarbons will be reformed, consequently the reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 11, if maintaining the air-fuel ratio (A/F)in lean while periodically lowering the air-fuel ratio (A/F)in, the hydrocarbons will be partially oxidized without being completely oxidized, that is, the hydrocarbons will be reformed and consequently the reducing intermediate will be produced. As opposed to this, when using an exhaust purification catalyst 13 with a weak oxidizing strength, as shown in FIG. 10, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the demanded minimum air-fuel ratio X has to be made lean.

Figure 12:
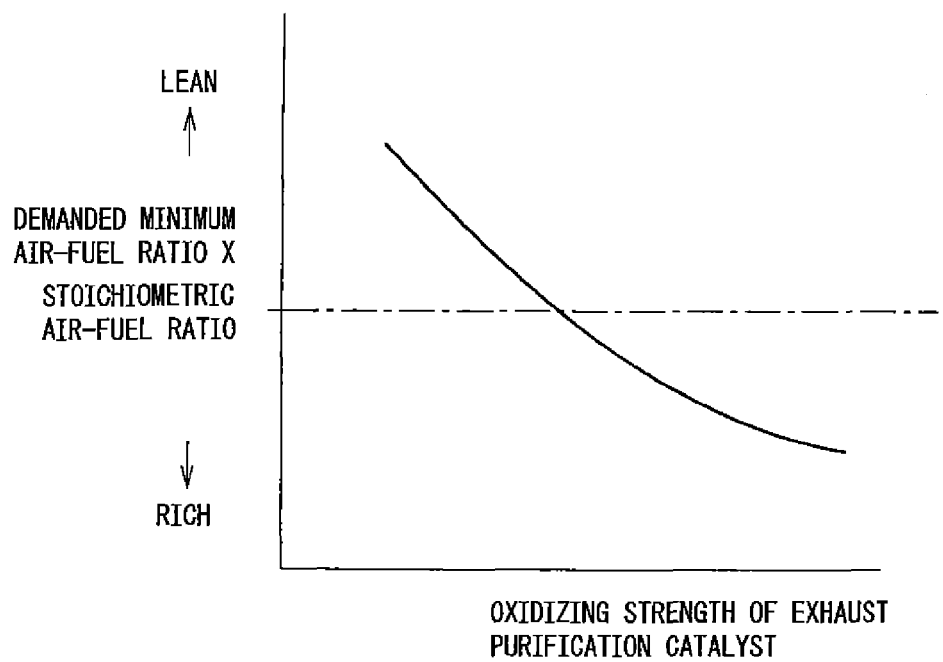
FIG. 12 is a view showing a relationship between an oxidizing strength of an exhaust purification catalyst and a demanded minimum air-fuel ratio X.

That is, it is learned that the demanded minimum air-fuel ratio X, as shown in FIG. 12, has to be reduced the stronger the oxidizing strength of the exhaust purification catalyst 13. In this way the demanded minimum air-fuel ratio X becomes lean or rich due to the oxidizing strength of the exhaust purification catalyst 13. Below, taking as example the case where the demanded minimum air-fuel ratio X is rich, the amplitude of the change in concentration of hydrocarbons flowing into the exhaust purification catalyst 13 and the vibration period of the concentration of hydrocarbons flowing into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which did not contribute the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
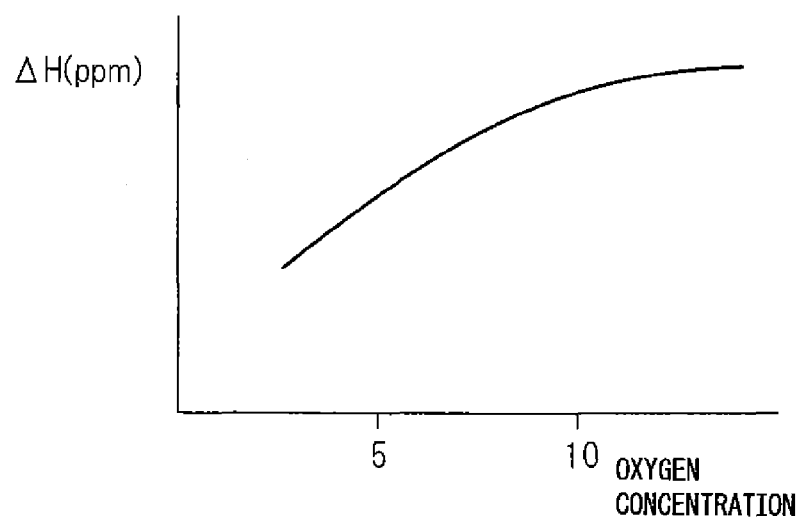
FIG. 13 is a view showing a relationship between an oxygen concentration in exhaust gas and an amplitude ΔH of a hydrocarbon concentration giving the same $NO_x$ purification rate.

FIG. 13 shows the relationship between the oxygen concentration in the exhaust gas before the hydrocarbons are fed and the amplitude ΔH of the hydrocarbon concentration when the same $NO_x$ purification rate is obtained. From FIG. 13, it is learned that, to obtain the same $NO_x$ purification rate, the higher the oxygen concentration in the exhaust gas before the hydrocarbons are fed, the greater the amplitude ΔH of the hydrocarbon concentration has to be made. That is, to obtain the same $NO_x$ purification rate, the higher the base air-fuel ratio (A/F)b, the greater the amplitude ΔT of the hydrocarbon concentration has to be made. In other words, to remove the $NO_x$ well, the lower the base air-fuel ratio (A/F)b, the more the amplitude ΔT of the hydrocarbon concentration can be reduced.

Figure 14:
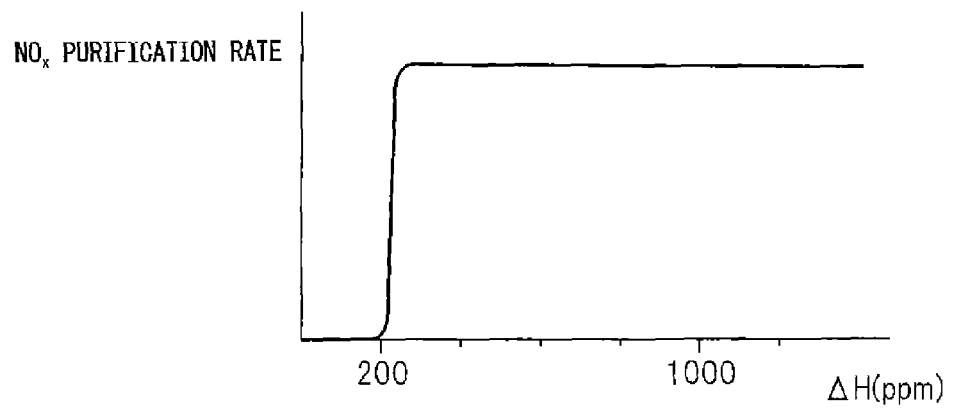
FIG. 14 is a view showing a relationship between an amplitude ΔH of a hydrocarbon concentration and an $NO_x$ purification rate.

In this regard, the base air-fuel ratio (A/F)b becomes the lowest at the time of an acceleration operation. At this time, if the amplitude ΔH of the hydrocarbon concentration is about 200 ppm, it is possible to remove the $NO_x$ well. The base air-fuel ratio (A/F)b is normally larger than the time of acceleration operation. Therefore, as shown in FIG. 14, if the amplitude ΔH of the hydrocarbon concentration is 200 ppm or more, an excellent $NO_x$ purification rate can be obtained.

On the other hand, it is learned that when the base air-fuel ratio (A/F)b is the highest, if making the amplitude ΔH of the hydrocarbon concentration 10000 ppm or so, an excellent $NO_x$ purification rate is obtained. Further, if the amplitude ΔH of the hydrocarbon concentration is over 10000 ppm, there is the danger that the air-fuel ratio (A/F)in will become rich. Therefore, there is the danger of the first $NO_x$ purification method no longer being able to be performed. Therefore, in the present invention, the predetermined range of the amplitude of the hydrocarbon concentration is made 200 ppm to 10000 ppm.

Figure 15:
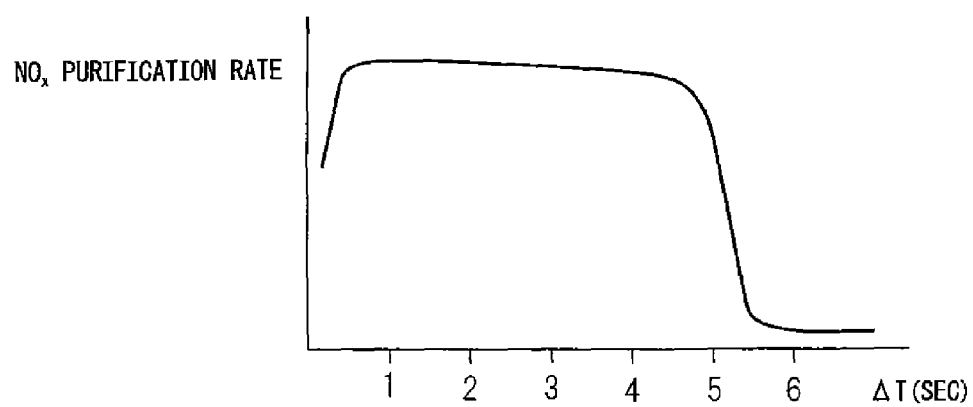
FIG. 15 is a view showing a relationship of a vibration period ΔT of a hydrocarbon concentration and an $NO_x$ purification rate.

Further, if the vibration period ΔT of the hydrocarbon concentration becomes longer, the oxygen concentration around the active $NO_2$* becomes higher in the time after the hydrocarbons are fed to when the hydrocarbons are next fed. In this case, if the vibration period ΔT of the hydrocarbon concentration becomes longer than about 5 seconds, the active $NO_2$* starts to be absorbed in the form of nitrates inside the basic layer 53. Therefore, as shown in FIG. 15, if the vibration period ΔT of the hydrocarbon concentration becomes longer than about 5 seconds, the $NO_x$ purification rate falls. Therefore, the vibration period ΔT of the hydrocarbon concentration has to be made 5 seconds or less.

On the other hand, if the vibration period ΔT of the hydrocarbon concentration becomes about 0.3 second or less, the fed hydrocarbons start to build up on the exhaust gas flow surface of the exhaust purification catalyst 13, therefore, as shown in FIG. 15, if the vibration period ΔT of the hydrocarbon concentration becomes about 0.3 second or less, the $NO_x$ purification rate falls. Therefore, in the present invention, the vibration period of the hydrocarbon concentration is made from 0.3 second to 5 seconds.

Figure 16:
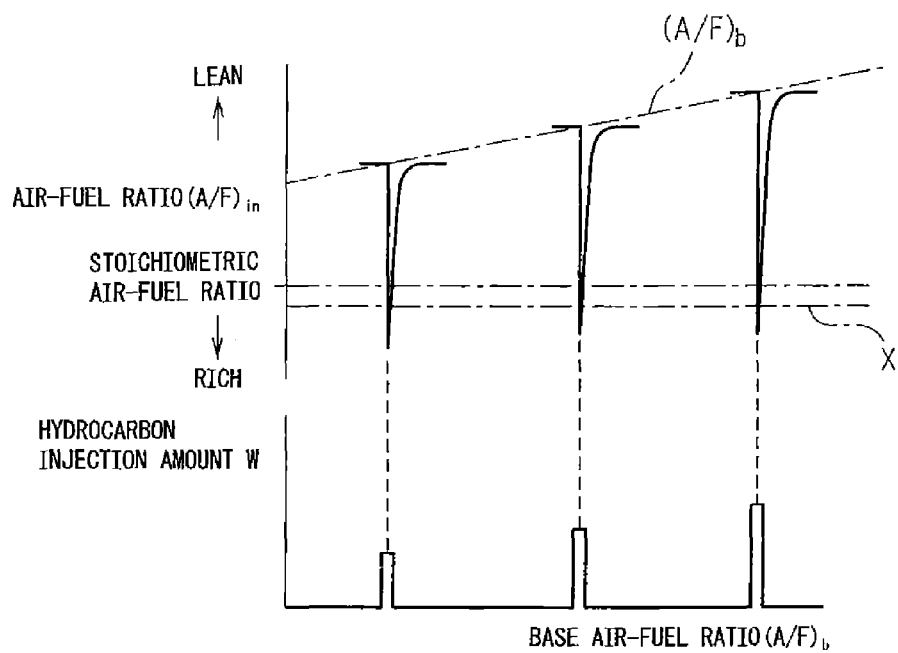
FIG. 16 is a time chart showing changes in an air-fuel ratio of exhaust gas flowing into an exhaust purification catalyst etc.
Figure 17:
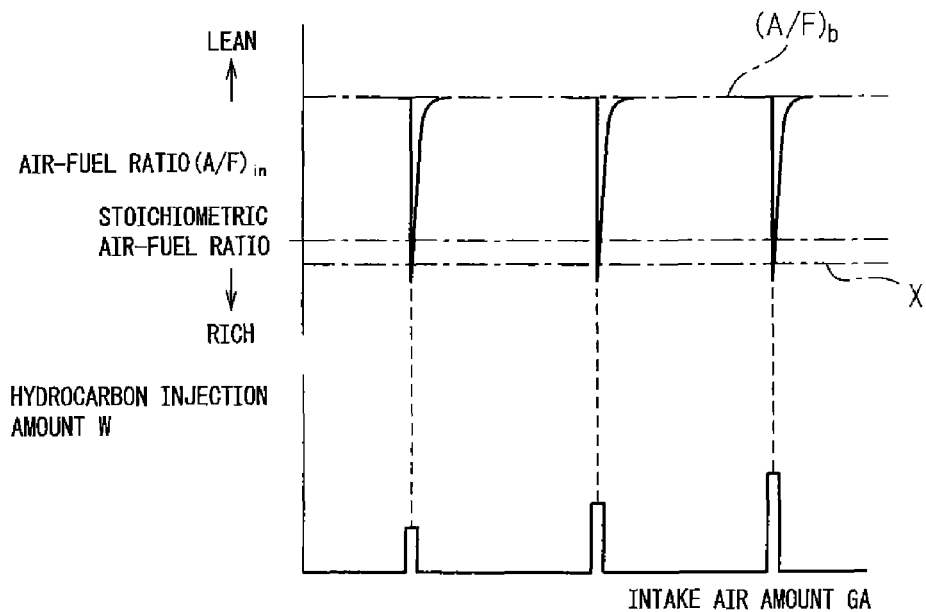
FIG. 17 is a time chart showing the changes in the air-fuel ratio of the exhaust gas flowing into the exhaust purification catalyst etc.

Now, in this embodiment according to the present invention, by changing the injection amount and injection timing of hydrocarbons from the hydrocarbon feed valve 16, the amplitude ΔH and vibration period ΔT of the hydrocarbon concentration are controlled so as to become the optimum values in accordance with the engine operating state. FIG. 16 and FIG. 17 show the changes in the optimum hydrocarbon concentration in accordance with the engine operating state and the injection amounts of hydrocarbons W from the hydrocarbon feed valve 16 causing these. Note that, FIG. 16 shows the case where the base air-fuel ratio (A/F)b is changed, while FIG. 17 shows the case where the intake air amount GA, that is, exhaust gas amount, is changed.

As explained above, to remove the $NO_x$ well, as shown in FIG. 16, the amplitude of the hydrogen concentration has to be increased as the base air-fuel ratio (A/F)b becomes higher. To make the amplitude of the hydrocarbon concentration larger, it is necessary to increase the injection amount of hydrocarbons W. Therefore, in this embodiment according to the present invention, the higher the base air-fuel ratio (A/F)b, the greater the injection amount of hydrocarbons W is made.

On the other hand, when the base air-fuel ratio (A/F)b is constant and under this a certain amount of hydrocarbons is fed, if the intake air amount GA increases, that is, if the exhaust gas amount increases, the hydrogen concentration in the exhaust gas will fall. In this case, to maintain the hydrogen concentration in the exhaust gas at a constant concentration regardless of the intake air amount GA, it is necessary that the hydrocarbon feed amount be increased as the intake air amount GA increases. Therefore, in this embodiment according to the present invention, as shown in FIG. 17, the more the intake air amount GA increases, the more the injection amount of hydrocarbons W is increased.

Figure 18:
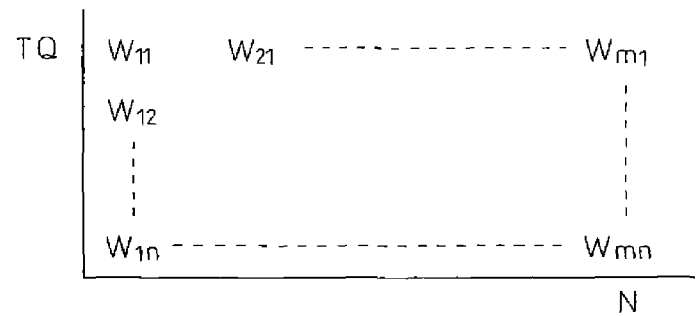
FIG. 18 is a view showing a map of the hydrogen feed amount W.

The injection amount of hydrocarbons W enabling the change of the optimum concentration of hydrocarbons in accordance with the engine operating state to be obtained in this way changes in accordance with the operating state of the engine. In this embodiment according to the present invention, the injection amount of hydrocarbons W is stored as a function of the demanded torque TQ of the engine and the engine speed N in the form of a map such as shown in FIG. 18 in advance in the ROM 32.

Figure 19:
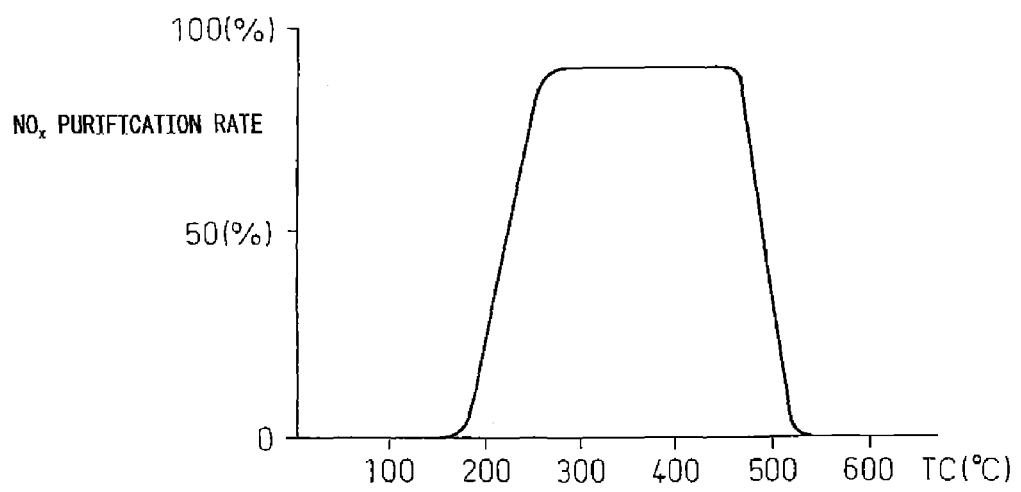
FIG. 19 is a view showing an $NO_x$ purification rate.

FIG. 19 shows the $NO_x$ purification rate when feeding aqueous urea solution sufficient for reducing the $NO_x$ which is contained in exhaust gas from the aqueous urea solution feed valve 17 and reducing the $NO_x$ which is contained in the exhaust gas at the $NO_x$ selective reduction catalyst 15. As will be understood from FIG. 19, this $NO_x$ selective reduction catalyst 15 becomes activated resulting in the $NO_x$ purification rate becoming higher if the temperature of the $NO_x$ selective reduction catalyst 15 exceeds about 200° C. The $NO_x$ purification method which uses the ammonia produced from the aqueous urea solution in this way to reduce the $NO_x$ which is contained in exhaust gas at the $NO_x$ selective reduction catalyst 15 will be referred to as the second $NO_x$ purification method below.

When using the first $NO_x$ purification method, as shown in FIG. 5, even if the temperature of the exhaust purification catalyst 13 becomes high, a high $NO_x$ purification rate can be obtained. On the other hand, the aqueous urea solution cannot be resupplied just anywhere, so it is preferable not to use the aqueous urea solution as much as possible. Therefore, in the present invention, usually, the first $NO_x$ purification method is used for an $NO_x$ purification action. However, as will be understood from FIG. 16 and FIG. 17, the leaner the base air-fuel ratio (A/F)b becomes, the more the hydrocarbon injection amount W increases, while the greater the intake air amount GA, the more the hydrocarbon injection amount W increases. In this case, if the hydrocarbon injection amount W extremely increases, the amount of consumption of hydrocarbons increases. In this case, it is preferable to use the second $NO_x$ purification method.

Therefore, in the present invention, usually, the first $NO_x$ purification method is used. When a representative value representing the amount of hydrocarbons which is consumed for purification of $NO_x$ by the first $NO_x$ purification method exceeds a predetermined allowable value, the second $NO_x$ purification method which uses the ammonia derived from the fed urea to reduce the $NO_x$ contained in the exhaust gas in the $NO_x$ selective reduction catalyst 15 is used.

As this representative value, it is possible to use the injection amount per injection of hydrocarbons fed for purification of $NO_x$ by the first $NO_x$ purification method. Further, as this representative value, it is also possible to use the oxygen concentration in the exhaust gas. Of course, as this representative value, it is also possible to use other values expressing the amount of consumption of hydrocarbons.

In this regard, the $NO_x$ selective reduction catalyst 15 which is used in the embodiments of the present invention is weak in oxidizing strength of hydrocarbons. Therefore, even if hydrocarbons flow into the $NO_x$ selective reduction catalyst 15, it cannot be expected that the heat of the oxidation reaction of the hydrocarbons can be used to make the temperature of the $NO_x$ selective reduction catalyst 15 rise. Therefore, in this embodiment according to the present invention, when the $NO_x$ selective reduction catalyst 15 should be raised in temperature, hydrocarbons are fed from the hydrocarbon feed valve 16 and the heat of oxidation reaction of the hydrocarbons at the exhaust purification catalyst 13 is used to raise the exhaust gas temperature and thereby raise the temperature of the $NO_x$ selective reduction catalyst 15.

Now, the temperature of the $NO_x$ selective reduction catalyst 15 differs depending on the position of attachment of the $NO_x$ selective reduction catalyst 15, but, for example, if arranging the exhaust purification catalyst 13 at the outlet of the exhaust turbine 7b and arranging the $NO_x$ selective reduction catalyst 15 far from the exhaust purification catalyst 13 under the floor of the vehicle, the temperature of the $NO_x$ selective reduction catalyst 15 becomes about 100° C. lower than the temperature of the exhaust purification catalyst 13.

On the other hand, when the first $NO_x$ purification method is being used, the exhaust purification catalyst 13 usually becomes 300° C. or more. Therefore, at this time, the $NO_x$ selective reduction catalyst 15 becomes 200° C. or more. As will be understood from FIG. 19, if the $NO_x$ selective reduction catalyst 15 becomes 200° C. or more, it becomes activated. Therefore, when the first $NO_x$ purification method is being used, usually the $NO_x$ selective reduction catalyst 15 is activated.

As opposed to this, if the $NO_x$ purification method is switched from the first $NO_x$ purification method to the second $NO_x$ purification method and, at this time, the feed of hydrocarbons is stopped, the $NO_x$ selective reduction catalyst 15 gradually falls in temperature. Therefore, in this embodiment according to the present invention, at this time, hydrocarbons are fed from the hydrocarbon feed valve 16 so that the $NO_x$ selective reduction catalyst 15 will not be deactivated. At this time, the amount of hydrocarbons required for maintaining the $NO_x$ selective reduction catalyst 15 in the activated state is found in advance by experiments. When the second $NO_x$ purification method is used for the $NO_x$ purification action, the amount of hydrocarbons found by this experiment is fed.

Figure 20A:
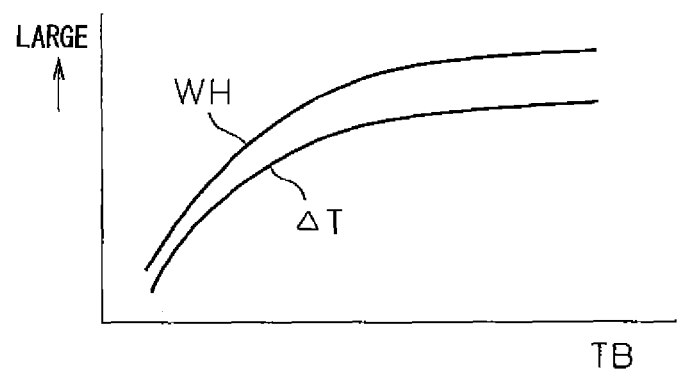
FIG. 20A and FIG. 20B are views showing the injection amount WH of hydrocarbons and injection interval $\Delta T$.
Figure 20B:
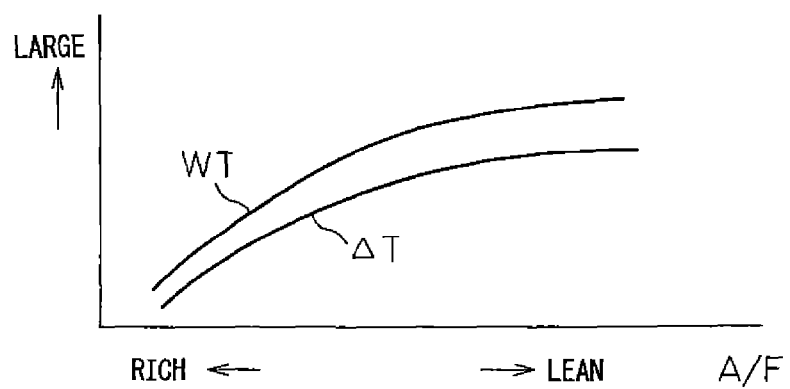

FIG. 20A and FIG. 20B show examples of the injection amount WH and the injection interval ΔT of hydrocarbons found by experiments required for maintaining the $NO_x$ selective reduction catalyst 15 in the active state when the second $NO_x$ purification method is being used. In this example, as shown in FIG. 20A, the injection amount WH and injection interval ΔT of hydrocarbons are functions of a temperature representing the temperature of the exhaust purification catalyst 13, for example, the temperature TB of the exhaust purification catalyst 13 and the injection amount WH and the injection interval ΔT of hydrocarbons increase the higher the temperature of the exhaust purification catalyst 13.

Figure 21A:
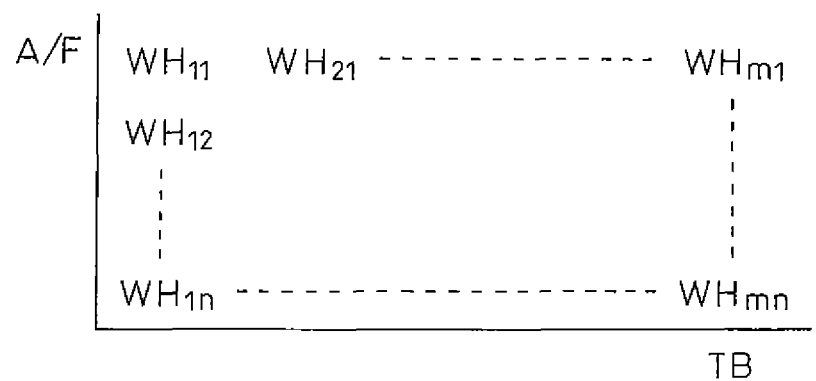
FIG. 21A and FIG. 21B are views showing maps of the injection amount WH and injection interval $\Delta T$.
Figure 21B:
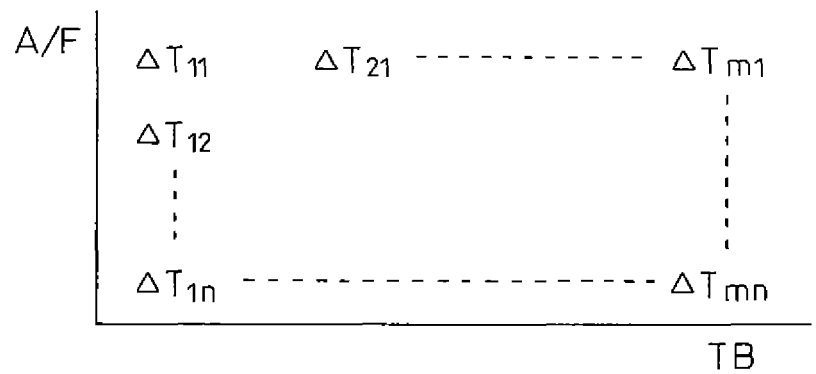

On the other hand, in this example, as shown in FIG. 20B, the injection amount WH and injection interval ΔT of hydrocarbons are a value representing the oxygen concentration in the exhaust gas, for example, the air-fuel ratio. The injection amount WH and the injection interval ΔT of hydrocarbons become greater the leaner the air-fuel ratio. The relationship between the injection amount WH and catalyst temperature TB and the air-fuel ratio A/F and the relationship between the injection interval ΔT and catalyst temperature TB and the air-fuel ratio A/F shown in FIG. 20A and FIG. 20B are respectively stored in the form of maps such as shown in FIG. 21A and FIG. 21B in advance in the ROM 32.

Note that, in this case, it is also possible to control just one of the injection amount WH and injection interval ΔT to maintain the $NO_x$ selective reduction catalyst 15 in the active state. Therefore, if considering this case as well, in this embodiment according to the present invention, one or both of the injection amount WH and injection interval ΔT of hydrocarbons which are fed when the second $NO_x$ purification method is used for the $NO_x$ purification action are stored in advance as functions of the temperature TB representing the temperature of the exhaust purification catalyst 13 and the value representing the oxygen concentration in the exhaust gas.

Figure 22:
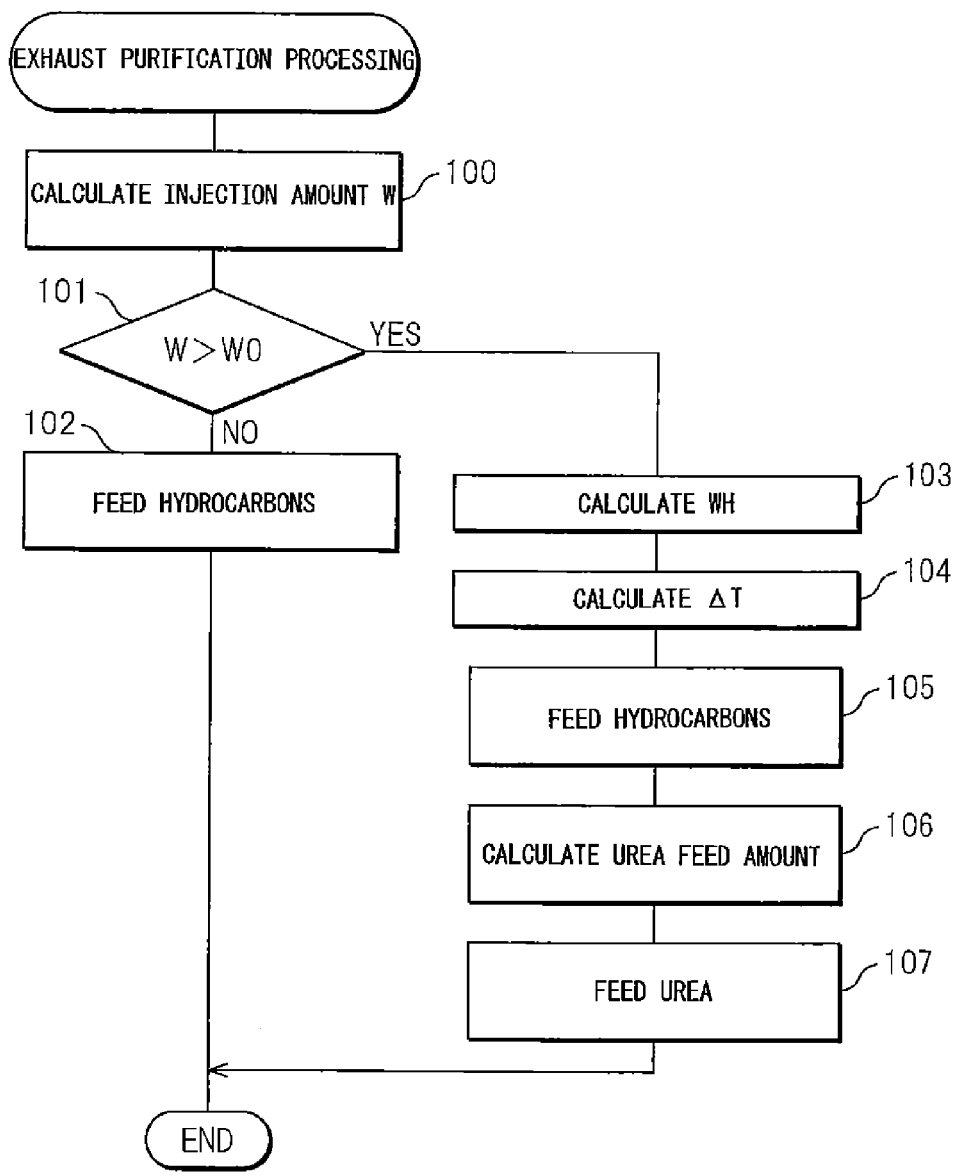
FIG. 22 is a flow chart for exhaust purification control.

FIG. 22 shows a first embodiment of an exhaust purification processing routine. This routine is executed by interruption every predetermined time.

In this embodiment, when the representative value representing the amount of hydrocarbons which is consumed for removing the $NO_x$ by the first $NO_x$ purification method exceeds a predetermined allowable value, the $NO_x$ purification method is switched from the first $NO_x$ purification method to the second $NO_x$ purification method regardless of whether the $NO_x$ selective reduction catalyst is activated. That is, in this embodiment, if the exhaust purification catalyst 13 is activated, normally it is considered that the $NO_x$ selective reduction catalyst 15 is also activated and the switching action of the $NO_x$ purification method is performed.

That is, referring to FIG. 22, first, at step 100, the injection amount W of hydrocarbons is calculated from the map shown in FIG. 18. Next, at step 101, it is judged if the above representative value, for example, the injection amount of hydrocarbons W, exceeds the allowable value $W_0$. When $W \leq W_0$, the routine proceeds to step 102 where hydrocarbons are injected from the hydrocarbon feed valve 16 in accordance with the injection amount W calculated at step 100 and a predetermined injection interval. At this time, the purification action of the $NO_x$ which is contained in the exhaust gas is performed by the first $NO_x$ purification method.

As opposed to this, when it is judged at step 101 that $W > W_0$, the routine proceeds to step 103 where the second $NO_x$ purification method is used for the purification action of the $NO_x$ which is contained in the exhaust gas. That is, at step 103 and at step 104, the injection amount WH and injection interval ΔT of hydrocarbons are respectively calculated from the maps shown in FIG. 21A and FIG. 21B, next, at step 105, hydrocarbons are injected from the hydrocarbon feed valve 16 in accordance with the injection amount WH and injection interval ΔT required for maintaining the $NO_x$ selective reduction catalyst 15 in the active state. Next, at step 106, the feed amount of the aqueous urea solution required for reducing the $NO_x$ which is contained in the exhaust gas is calculated, next, at step 107, the calculated amount of aqueous urea solution is fed from the aqueous urea solution feed valve 17.

Figure 23:
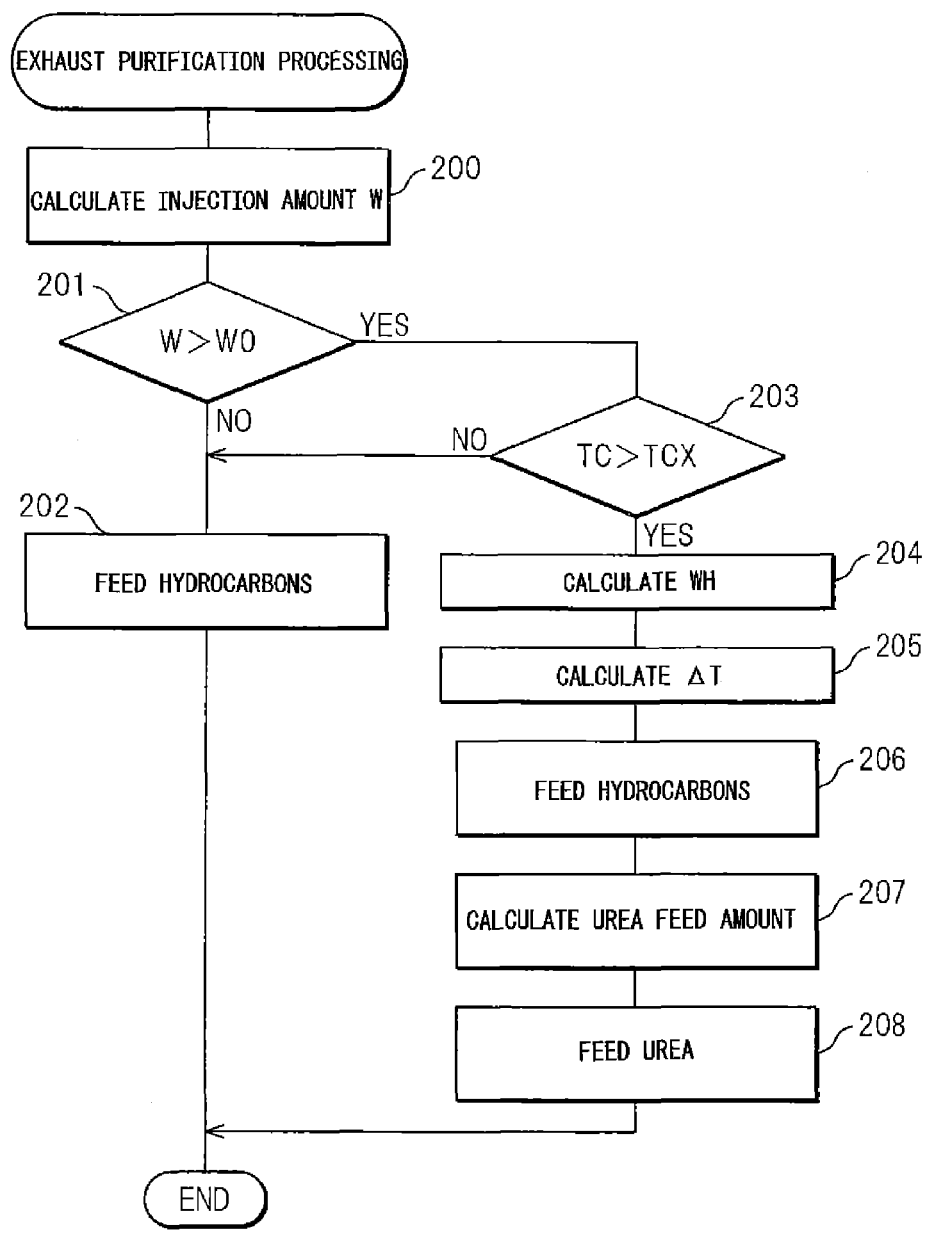
FIG. 23 is a flow chart for exhaust purification control.

FIG. 23 shows a second embodiment of an exhaust purification processing routine. This routine is also executed by interruption every certain time.

In this embodiment, when the representative value representing the amount of hydrocarbons which is consumed for removal of $NO_x$ by the first $NO_x$ purification method exceeds a predetermined allowable value, if the $NO_x$ selective reduction catalyst 15 is activated, the $NO_x$ purification method is switched from the first $NO_x$ purification method to the second $NO_x$ purification method. That is, in this embodiment, when the above representative value exceeds the above allowable value, if the $NO_x$ selective reduction catalyst 15 is not activated, the $NO_x$ purification action by the first $NO_x$ purification method is continued. When the $NO_x$ selective reduction catalyst 15 is later activated, at that time, the $NO_x$ purification method is switched from the first $NO_x$, purification method to the second $NO_x$ purification method.

That is, referring to FIG. 23, first, at step 200, the injection amount W of hydrocarbons is calculated from the map shown in FIG. 18. Next, at step 201, it is judged if the above representative value, for example, the injection amount W of hydrocarbons, exceeds the allowable value $W_0$. When W≤$W_0$, the routine proceeds to step 202 where hydrocarbons are fed from the hydrocarbon feed valve 16 in accordance with the injection amount W calculated at step 200 and a predetermined injection interval. At this time, the purification action of the $NO_x$ which is contained in the exhaust gas is performed by the first $NO_x$ purification method.

As opposed to this, when it is judged at step 201 that W>$W_0$, the routine proceeds to step 203 where it is judged if the temperature TC of the $NO_x$, selective reduction catalyst 15 exceeds the activation temperature TCX, for example, 200° C. When TC≤TCX, that is, when the $NO_x$ selective reduction catalyst 15 is not activated, the routine proceeds to step 202 where the purification action of the $NO_x$, in the exhaust gas is performed by the first $NO_x$ purification method.

As opposed to this, when it is judged at step 203 that TC>TCX, that is, when the $NO_x$ selective reduction catalyst 15 is activated, the routine proceeds to step 204 where the purification action of $NO_x$ which is contained in exhaust gas is performed by the second $NO_x$ purification method. That is, at step 204 and at step 205, the injection amount WH and injection interval ΔT of hydrocarbons are respectively calculated from the maps shown in FIG. 21A and FIG. 21B, next, at step 206, hydrocarbons are injected from the hydrocarbon feed valve 16 in accordance with the injection amount WH and injection interval ΔT required for maintaining the $NO_x$ selective reduction catalyst 15 in the activated state. Next, at step 207, the feed amount of the aqueous urea solution required for reducing the $NO_x$ which is contained in the exhaust gas is calculated, next, at step 208, this calculated amount of aqueous urea solution is fed from the aqueous urea solution feed valve 17.

Figure 24:
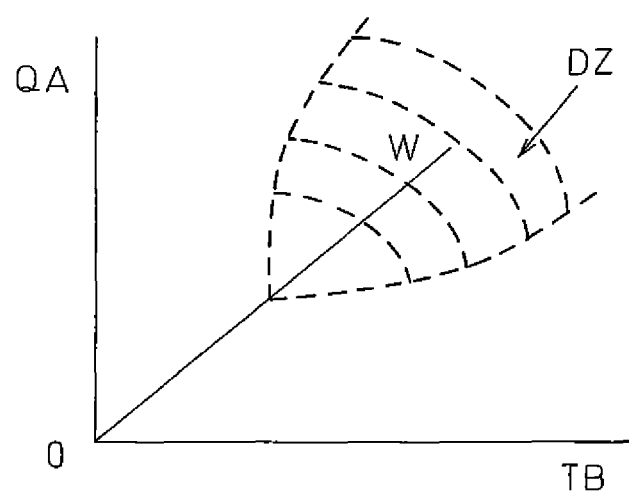
FIG. 24 is a view showing a region where there is a danger of clogging occurring.

FIG. 24 and FIG. 25 show a third embodiment. In the embodiment shown in FIG. 1, when the injection amount of hydrocarbons increases for performing the first $NO_x$ purification method, if the action of increasing the injection amount of hydrocarbons continues, sometimes there is a danger that the exhaust purification catalyst 13 will clog or thermally degrade. When there is such a danger, it is necessary to stop the purification of $NO_x$ by the first $NO_x$ purification method.

Therefore, in this embodiment, the state of the engine and exhaust purification catalyst 13 where the purification of $NO_x$ by the first $NO_x$ purification method should be stopped is set in advance. When the engine and exhaust purification catalyst 13 become this state, the exhaust purification method is switched from the first $NO_x$ purification method to the second $NO_x$ purification method. As an example of such a state, there is the time when there is the danger of the exhaust purification catalyst 13 clogging or there is the danger of the exhaust purification catalyst 13 thermally degrading.

FIG. 24 shows the region in which there is the danger of the mainly upstream end of the exhaust purification catalyst 13 clogging by DZ in the 3D space of the injection amount W of hydrocarbons, the temperature TB of the exhaust purification catalyst 13, and the intake air amount QA as the xyz axes. That is, when the injection amount W is large, the temperature TB of the exhaust purification catalyst 13 is low, and the intake air amount QA is small, the fed hydrocarbons easily pool at the upstream end of the exhaust purification catalyst 13 in a liquid state, therefore there is the danger that the exhaust purification catalyst 13 will become clogged. Therefore, in this embodiment, when the engine and exhaust purification catalyst 13 are in the region DZ shown in FIG. 24, the $NO_x$ purification action by the first $NO_x$ purification method is stopped.

On the other hand, if the injection amount W of hydrocarbons increases and the heat of oxidation reaction of the hydrocarbons causes the temperature TB of the exhaust purification catalyst 13 to become extremely high, there is the danger that the exhaust purification catalyst 13 will degrade due to heat. Therefore, in this embodiment, when the temperature TB of the exhaust purification catalyst 13 reaches the limit temperature TBX causing thermal degradation, the $NO_x$ purification action by the first $NO_x$ purification method is stopped. Note that, in this embodiment, while the $NO_x$ purification method by the first $NO_x$ purification method is stopped, the hydrocarbons required for maintaining the $NO_x$ selective reduction catalyst 15 in the activated state are fed from the hydrocarbon feed valve 16.

FIG. 25 shows a processing routine for exhaust purification for working a third embodiment. This routine is also executed by interruption every certain time.

Referring to FIG. 25, first, at step 300, it is judged if the state of the engine and exhaust purification catalyst 13 is within the region DZ shown in FIG. 24. When the state of the engine and exhaust purification catalyst 13 is not within the region DZ shown in FIG. 24, the routine proceeds to step 301 where it is judged if the temperature TB of the exhaust purification catalyst 13 becomes higher than the limit temperature TBX causing thermal degradation. When TB≤TBX, the routine proceeds to step 302.

At step 302, the injection amount W of hydrocarbons is calculated from the map shown in FIG. 18. Next, at step 303, it is judged if the above-mentioned representative value, for example, the injection amount W of hydrocarbons, exceeds the allowable value $W_0$. When W≤$W_0$, the routine proceeds to step 304 where hydrocarbons are fed from the hydrocarbon feed valve 16 is accordance with the injection amount W calculated at step 302 and a predetermined injection interval.

At this time, the purification action of the $NO_x$ contained in the exhaust gas is performed by the first $NO_x$ purification method.

As opposed to this, when, at step 303, it is judged that $W>W_0$, the routine proceeds to step 305 where it is judged if the temperature TC of the $NO_x$ selective reduction catalyst 15 exceeds the activation temperature TCX, for example, 200° C. When TC≤TCX, that is, when the $NO_x$ selective reduction catalyst 15 is not activated, the routine proceeds to step 304 where the first $NO_x$ purification method is used for the purification action of the $NO_x$ in the exhaust gas.

As opposed to this, when it is judged at step 305 that TC>TCX, that is, when the $NO_x$ selective reduction catalyst 15 is activated, the routine proceeds to step 306 where the second $NO_x$ purification method is used for the purification action of the $NO_x$ which is contained in the exhaust gas. That is, at step 306 and at step 307, the injection amount WH and injection interval ΔT of hydrocarbons are calculated from the maps shown in FIG. 21A and FIG. 21B, next, at step 308, hydrocarbons are injected from the hydrocarbon feed valve 16 in accordance with these injection amount WH and injection interval ΔT required for maintaining the $NO_x$ selective reduction catalyst 15 in the activated state. Next, at step 309, the feed amount of the aqueous urea solution required for reducing the $NO_x$ which is contained in the exhaust gas is calculated, next, at step 310, this calculated amount of aqueous urea solution is fed from the aqueous urea solution feed valve 17.

On the other hand, when it is judged at step 300 that the states of the engine and exhaust purification catalyst 13 are within the region DZ shown in FIG. 24 or when it is judged at step 301 that TB>TBX, the routine proceeds to step 306, and the $NO_x$ purification method is switched from the first $NO_x$ purification method to the second $NO_x$ purification method.

REFERENCE SIGNS LIST

4 . . . intake manifold
5 . . . exhaust manifold
7 . . . exhaust turbocharger
12 . . . exhaust pipe
13 . . . exhaust purification catalyst
15 . . . $NO_x$ selective reduction catalyst
16 . . . hydrocarbon feed valve
17 . . . aqueous urea solution feed valve

The invention claimed is:

1. An exhaust purification system of an internal combustion engine comprising:
   an engine exhaust passage;
   an exhaust purification catalyst for reacting $NO_x$ contained in exhaust gas and reformed hydrocarbons arranged inside of the engine exhaust passage;
   a urea feeding device arranged inside of the engine exhaust passage downstream of the exhaust purification catalyst;
   an $NO_x$ selective reduction catalyst able to reduce $NO_x$ using ammonia derived from urea fed from the urea feeding device arranged inside of the engine exhaust passage downstream of the exhaust purification catalyst;
   a precious metal catalyst carried on an exhaust gas flow surface of the exhaust purification catalyst;
   a basic exhaust gas flow surface part formed around the precious metal catalyst; and
   an electronic control unit, wherein the electronic control unit is configured to control a vibration of a concentration of hydrocarbons flowing into the exhaust purification catalyst within a predetermined range of amplitude and within a predetermined range of period, and is configured to control the vibration period of the hydrocarbon concentration longer than the predetermined range of period, wherein
   when the electronic control unit controls the vibration of the concentration of hydrocarbons flowing into the exhaust purification catalyst within the predetermined range of amplitude and within the predetermined range of period, the exhaust purification catalyst has a property of producing a reducing intermediate containing nitrogen and hydrocarbons that chemically reduces the $NO_x$ contained in the exhaust by a reducing action of the produced reducing intermediate, and the exhaust purification catalyst chemically reduces the $NO_x$ that is contained in exhaust gas without storing, or storing a fine amount of nitrates in the basic exhaust gas flow surface part,
   when the electronic control unit controls the vibration period of the hydrocarbon concentration longer than the predetermined range of period, the exhaust purification catalyst has a property of being increased in storage amount of $NO_x$ that is contained in exhaust gas, and
   when a representative value representing an amount of hydrocarbons that is consumed for removal of $NO_x$ when the electronic control unit is controlling the vibration of the concentration of hydrocarbons flowing into the exhaust purification catalyst within the predetermined range of amplitude and within the predetermined range of period exceeds a predetermined allowable value, the electronic control unit is configured to cause the urea feeding device to feed urea to the exhaust as to reduce $NO_x$ contained in exhaust gas at the $NO_x$ selective reduction catalyst.

2. The exhaust purification system of an internal combustion engine as claimed in claim 1, wherein a state of the engine and exhaust purification catalyst at which the electronic control unit stops controlling the vibration of the concentration of hydrocarbons flowing into the exhaust purification catalyst within the predetermined range of amplitude and within the predetermined range of period is set in advance, and wherein when the engine and exhaust purification catalyst become the set state, the electronic control unit is configured to stop controlling the vibration of the concentration of hydrocarbons flowing into the exhaust purification catalyst within the predetermined range of amplitude and within the predetermined range of period, and is configured cause the urea feeding device to feed urea to the exhaust gas to reduce $NO_x$ contained in exhaust gas at the $NO_x$ selective reduction catalyst.

3. The exhaust purification system of an internal combustion engine as claimed in claim 2, wherein the state set in advance is when there is a danger of the exhaust purification catalyst becoming clogged, or when there is a danger of the exhaust purification catalyst becoming thermally degraded.

4. The exhaust purification system of an internal combustion engine as claimed in claim 1, wherein the representative value is an injection amount per injection of hydrocarbons that are fed when the electronic control unit is controlling the vibration of the concentration of hydrocarbons flowing into the exhaust purification catalyst within the predetermined range of amplitude and within the predetermined range of period.

5. The exhaust purification system of an internal combustion engine as claimed in claim 1, wherein the representative value is an oxygen concentration in the exhaust gas.

6. The exhaust purification system of an internal combustion engine as claimed in claim 1, wherein when the electronic control unit is causing the urea feeding device to feed urea to the exhaust gas to reduce $NO_x$ contained in exhaust gas at the $NO_x$ selective reduction catalyst, the electronic control unit is configured to cause the feeding of an amount of hydrocarbons that is necessary for maintaining the $NO_x$ selective reduction catalyst in an activated state.

7. The exhaust purification system of an internal combustion engine as claimed in claim 6, wherein one of, or both of, an injection amount of, and/or injection interval of, hydrocarbons that are fed when the electronic control unit is causing the urea feeding device to feed urea to the exhaust gas to reduce $NO_x$ contained in exhaust gas at the $NO_x$ selective reduction catalyst is stored in advance as a function of a temperature representing a temperature of the exhaust purification catalyst and a value representing an oxygen concentration in the exhaust gas.

8. The exhaust purification system of an internal combustion engine as claimed in claim 1, wherein when the representative value exceeds the predetermined allowable value, if the $NO_x$ selective reduction catalyst is not activated, the electronic control unit is configured to continue controlling the vibration of the concentration of hydrocarbons flowing into the exhaust purification catalyst within the predetermined range of amplitude and within the predetermined range of period.

9. The exhaust purification system of an internal combustion engine as claimed in claim 1, wherein $NO_x$ contained in exhaust gas and reformed hydrocarbons react in the exhaust purification catalyst to produce the reducing intermediate containing nitrogen and hydrocarbons, and wherein the predetermined vibration period of the hydrocarbon concentration is the vibration period necessary for continued production of the reducing intermediate.

10. The exhaust purification system of an internal combustion engine as claimed in claim 9, wherein the predetermined vibration period of the hydrocarbon concentration is from 0.3 seconds to 5 seconds.

11. The exhaust purification system of an internal combustion engine as claimed in claim 1, wherein when the representative value exceeds the predetermined allowable value, the electronic control unit is configured to cause the urea feeding device to feed urea to the exhaust gas regardless of whether the $NO_x$ selective reduction catalyst is activated.

12. The exhaust purification system of an internal combustion engine as claimed in claim 1, wherein when the representative value exceeds the predetermined allowable value, the electronic control unit is configured to cause the urea feeding device to feed urea to the exhaust gas if the $NO_x$ selective reduction catalyst is activated.

* * * * *